United States Patent
Görgen et al.

(10) Patent No.: US 9,909,474 B2
(45) Date of Patent: Mar. 6, 2018

(54) METHOD FOR OPERATING A DRIVE DEVICE AND CORRESPONDING DRIVE DEVICE

(71) Applicant: Audi AG, Ingolstadt (DE)

(72) Inventors: Michael Görgen, Kall (DE); Markus Sonner, Kipfenberg (DE); Felix Knackstedt, Ingolstadt (DE)

(73) Assignee: Audi AG, Ingolstadt (DE)

( * ) Notice: Subject to any disclaimer, the term of this patent is extended or adjusted under 35 U.S.C. 154(b) by 26 days.

(21) Appl. No.: 14/970,194

(22) Filed: Dec. 15, 2015

(65) Prior Publication Data

US 2016/0177796 A1 Jun. 23, 2016

(30) Foreign Application Priority Data

Dec. 19, 2014 (DE) .................. 10 2014 019 195

(51) Int. Cl.
  *F01N 3/00* (2006.01)
  *F01N 3/08* (2006.01)
  (Continued)

(52) U.S. Cl.
  CPC ....... *F01N 3/0864* (2013.01); *F02D 41/0235* (2013.01); *F02D 41/1439* (2013.01); *F02D 41/1454* (2013.01); *F01N 2430/06* (2013.01); *F01N 2560/025* (2013.01); *F01N 2570/16* (2013.01); *F01N 2900/1402* (2013.01); *F01N 2900/1624* (2013.01); *F02D 41/1445* (2013.01); *F02D 41/1446* (2013.01);
  (Continued)

(58) Field of Classification Search
  CPC .......... F01N 3/0864; F01N 2900/1624; F02D 41/1439
  See application file for complete search history.

(56) References Cited

U.S. PATENT DOCUMENTS 7,007,457 B2   3/2006  Ellmer
7,502,683 B2 *  3/2009  Rodatz ............... F02D 41/1401
                                                         60/274

(Continued)

FOREIGN PATENT DOCUMENTS

CN    1619121    5/2005
CN    101137831  3/2008

(Continued)

OTHER PUBLICATIONS

Chinese Search Report dated Dec. 5, 2017 with respect to counterpart Chinese patent application 201510794374.X.

Primary Examiner — Mark Laurenzi
Assistant Examiner — Jason Sheppard
(74) Attorney, Agent, or Firm — Henry M. Feiereisen LLC

(57) ABSTRACT

A method for operating a drive device having an internal combustion engine and an exhaust gas purification device for exhaust gas of the internal combustion engine includes performing an oxygen removal operation for removing oxygen from the exhaust gas purification device, wherein the oxygen removal operation includes at least one of operating the internal combustion engine sub-stoichiometrically and introducing additional fuel into the exhaust gas, wherein the oxygen removal operation is performed until a lambda value detected by a lambda probe arranged in the exhaust gas purification device reaches a defined lambda threshold value.

7 Claims, 1 Drawing Sheet

(51) Int. Cl.
*F02D 41/02* (2006.01)
*F02D 41/14* (2006.01)

(52) U.S. Cl.
CPC ............... *F02D 2200/0614* (2013.01); *F02D 2200/0814* (2013.01); *Y02T 10/20* (2013.01); *Y02T 10/47* (2013.01)

(56) References Cited

U.S. PATENT DOCUMENTS

| | | | |
|---|---|---|---|
| 7,700,050 B2 | 4/2010 | Brück et al. | |
| 8,250,912 B2 * | 8/2012 | Odendall | F01N 3/0864 73/114.73 |
| 8,522,608 B2 * | 9/2013 | Odendall | F02D 41/0295 73/114.75 |
| 2008/0053187 A1 | 3/2008 | Koring | |
| 2011/0056269 A1 | 3/2011 | Odendall et al. | |
| 2011/0138876 A1 * | 6/2011 | Arlt | F02D 41/1454 73/23.31 |
| 2012/0053816 A1 | 3/2012 | Odendall | |

FOREIGN PATENT DOCUMENTS

| | | |
|---|---|---|
| CN | 101493026 | 7/2009 |
| DE | 102 44 128 | 6/2006 |
| DE | 102005029797 | 2/2007 |
| DE | 102006041477 | 3/2008 |
| DE | 102009039929 | 4/2011 |
| DE | 102010035365 | 7/2012 |

\* cited by examiner

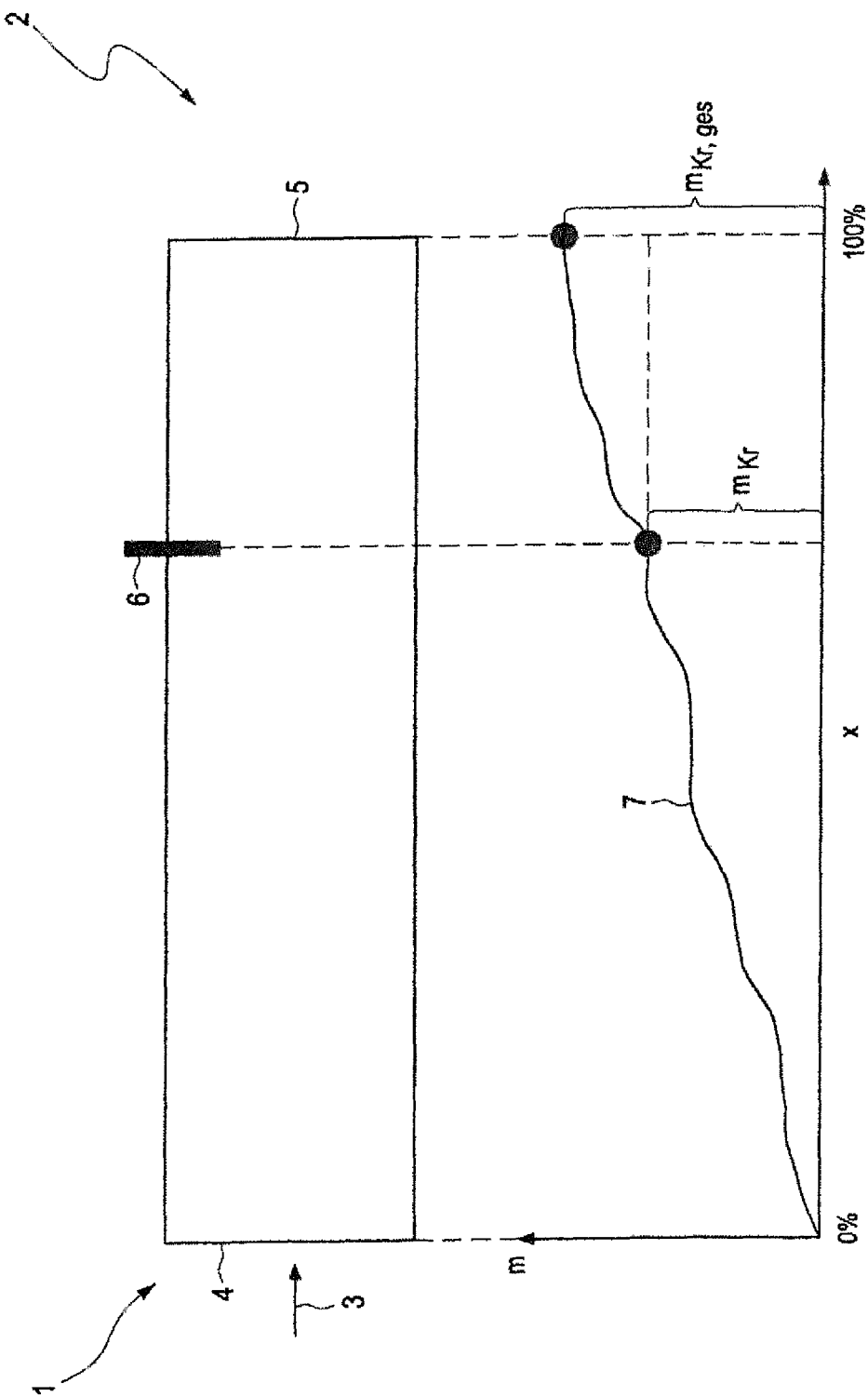

METHOD FOR OPERATING A DRIVE DEVICE AND CORRESPONDING DRIVE DEVICE

CROSS-REFERENCES TO RELATED APPLICATIONS

This application claims the priority of German Patent Application, Serial No. 10 2014 019 195.8, filed Dec. 19, 2014, pursuant to 35 U.S.C. 119(a)-(d), the disclosure of which is incorporated herein by reference.

BACKGROUND OF THE INVENTION

The present invention relates to a method for operating a drive device which has an internal combustion engine and an exhaust gas purification device for exhaust gas of the internal combustion engine The following discussion of related art is provided to assist the reader in understanding the advantages of the invention, and is not to be construed as an admission that this related art is prior art to this invention.

The drive device of a motor vehicle serves for example for providing a torque for driving the motor vehicle. The drive device includes an internal combustion engine, in particular for providing the torque. During operation of the drive device or the internal combustion engine, exhaust gas is generated which is discharged in the direction of an external environment of the drive device.

For this reason an exhaust gas purification device is provided, which serves for purifying the exhaust gas of the internal combustion engine before it reaches the environment. The exhaust gas purification device is for example constructed as a catalytic converter. The exhaust gas purification device has an oxygen accumulator, which can generally be constructed in any desired manner. Particularly preferably the oxygen accumulator is applied to a catalytically active surface of the catalytic converter. The exhaust gas purification device having the oxygen accumulator and being configured as catalytic converter can insofar be referred to as storage catalytic converter.

The exhaust gas purification device is usually configured so that it can only convert pollutants, for example hydrocarbons, nitrogen oxide, nitrogen dioxide and carbon monoxide, when the internal combustion engine is operated stoichiometrically. During operation the drive device, however, the drive device may sometimes be operated in the so-called trailing throttle mode, i.e., the internal combustion engine is operated without introducing fuel. This leads to a large amount of uncombusted oxygen entering the exhaust gas purification device.

The exhaust gas purification device takes up or temporarily stores the thusly generated oxygen. Of course the oxygen accumulator of the exhaust gas purification device can also be loaded with oxygen in a different way, for example during a super-stoichiometric operation of the internal combustion engine. However, the greater an oxygen fill level of the exhaust gas purification device is, i.e., the more the latter is loaded with oxygen, the lower is the conversion efficiency for certain pollutants, for example nitrogen dioxide. In particular the conversion efficiency decreases to zero as soon as the oxygen fill level of the exhaust gas purification device exceeds a defined maximal oxygen fill level.

For this reason the oxygen removal operation is performed in particular when the oxygen fill level exceeds (reaches) a defined oxygen threshold fill level, which for example corresponds to the maximal oxygen fill level. During the oxygen removal operation the oxygen is removed from the exhaust gas purification device or the oxygen accumulator. For example the oxygen removal operation is performed until a defined oxygen setpoint fill level is reached. The oxygen setpoint fill level can for example correspond to an oxygen minimal fill level or an oxygen fill level that lies midway between the oxygen minimal fill level and the oxygen maximal fill level.

It would be desirable and advantageous to provide a more reliable and efficient method for operating a drive device, in an oxygen removal operation.

SUMMARY OF THE INVENTION

According to one aspect of the present invention, a method for operating a drive device having an internal combustion engine and an exhaust gas purification device for exhaust gas of the internal combustion engine includes performing an oxygen removal operation for removing oxygen from the exhaust gas purification device, wherein the oxygen removal operation includes at least one of operating the internal combustion engine sub-stoichiometrically and introducing additional fuel into the exhaust gas, wherein the oxygen removal operation is performed until a lambda value detected by a lambda probe arranged in the exhaust gas purification device reaches a defined lambda threshold value. The oxygen removal operation is preferably initiated when the oxygen fill level has reached or exceeded the oxygen threshold fill level.

During the oxygen removal operation, the internal combustion engine is for example adjusted so that it generates sub-stoichiometric exhaust gas, i.e., the exhaust gas has a proportion of uncombusted hydrocarbons, which stoichiometrically is greater than the proportion of residual oxygen, i.e., uncombusted oxygen. For this purpose the internal combustion engine is preferably operated sub-stoichiometrically, i.e., less oxygen is supplied to the internal combustion engine than required for combustion of the simultaneously supplied fuel. Of course the oxygen removal operation can also be performed in a different manner, for example by introducing uncombusted fuel into the exhaust gas of the internal combustion engine upstream of the exhaust gas purification device.

The oxygen removal operation is performed at least until the lambda value determined with the lambda probe has reached the lambda threshold value. The oxygen removal operation is thus terminated at the earliest when this condition is satisfied. Of course the oxygen removal operation can also be performed for a longer period of time, i.e., it can be continued after the lambda value reaches the lambda threshold value.

A particular aspect is hereby is that the lambda probe is arranged in the exhaust gas purification device itself. Thus the lambda probe is not arranged upstream or downstream of the exhaust gas purification device. Rather the lambda probe is arranged downstream of a gas entry point of the gas purifying device and upstream of a gas exit point of the exhaust gas purification device, wherein the exhaust gas enters through the exhaust entry point into the exhaust gas purification device and exits through the exhaust gas exit point. The lambda probe is thus fluidly arranged between the exhaust gas entry point and the exhaust gas exit point.

The lambda threshold value is for example selected so that it corresponds to a stoichiometric composition of the exhaust gas, which is present when the internal combustion engine is operated stoichiometrically. The lambda value detected with the lambda probe can correspond to a combustion air ratio, which describes the ratio of air to fuel during the combustion in the internal combustion engine. In this case the oxygen removal operation is preferably performed at least until the lambda value has reached or has fallen below the lambda threshold value. As an alternative of course the lambda value can correspond to the measuring value directly measured by the lambda probe, for example a voltage. In this case the oxygen removal operation is performed for example until the lambda value has reached or exceeded the lambda threshold value.

The described approach has the advantage that the oxygen amount removed from the exhaust gas purification device or the region of the exhaust gas purification device from which the oxygen has already been removed, can be determined very accurately. This avoids that during the oxygen removal operation uncombusted fuel or uncombusted hydrocarbons escape through the exhaust gas purification device and are in particular released into the external environment of the exhaust gas purification device.

According to another advantageous feature of the invention, the lambda probe can be arranged in the exhaust gas purification device at a position, which corresponds to at least 30%, at least 40%, at least 50%, at least 60%, at least 70% at least 80% or at least 90% of a total flow through length of the exhaust gas purification device. The total flow through length of the exhaust gas purification device defines the length of the distance the exhaust gas has to travel when flowing through the exhaust gas purification device. In particular the total flow through length is thus the length of the flow path of the exhaust gas between the exhaust gas entry point and the exhaust gas exit point of the exhaust gas purification device. This length can for example correspond to the distance between the exhaust gas entry point and the exhaust gas exit point.

The total flow through length, and thus the position of the lambda probe, is determined based on the exhaust gas entry point of the exhaust gas purification device. Particularly preferably the distance of the lambda probe to the exhaust gas entry point is greater than the distance to the exhaust gas exit point, so that also the position of the lambda probe in the exhaust gas purification device is preferably corresponds to more than 50% of the total flow through length of the exhaust gas purification device. For example the position of the lambda probe corresponds to between 60% and 90%, between 60% and 80%, between 60% and 70% between 64% and 68%, particularly preferably ⅔ of the total flow through length of the exhaust gas purification device.

According to another advantageous feature of the invention, during the oxygen removal operation the total fuel amount introduced into the internal combustion engine is detected and the oxygen removal operation is terminated when the total fuel amount exceeds a predetermined total fuel amount threshold value. Immediately at the beginning of the oxygen removal operation the total fuel amount is thus particularly preferably reset, for example to zero. Subsequently the fuel amount introduced into the internal combustion engine is detected and integrated or added up. The total fuel amount is insofar the fuel amount, which was introduced into the internal combustion engine since the beginning of the oxygen removal operation until the current time point.

According to another advantageous feature of the invention, the oxygen removal operation is terminated when the total fuel amount exceeds the total fuel amount threshold value. This condition is to be understood in addition or alternative to the aforementioned condition that the oxygen removal operation is performed until the lambda value detected by the lambda probe arranged in the exhaust gas purification device has reached the lambda threshold value. Particularly preferably both conditions are used so that the oxygen removal operation is only terminated when the lambda value reaches or has already reached the defined lambda threshold value and the total fuel amount is greater than the total fuel amount threshold value.

According to another advantageous feature of the invention, the method further includes defining the total fuel amount value as a total amount of the additional fuel introduced into the exhaust gas since the beginning of the oxygen removal operation when the lambda value detected with the lambda probe reaches the defined lambda threshold value. At the time point at which the lambda value reaches the lambda threshold value, the total fuel amount threshold value is thus set to the total fuel amount detected so far and is subsequently stored. While the total fuel amount corresponds to the fuel amount introduced into the internal combustion engine since the beginning of the oxygen removal operation, the total fuel amount value is constant, in particular it does not track the total fuel amount.

According to another advantageous feature of the invention the total fuel amount threshold value is determined from the total fuel amount value and the position of the lambda probe. As mentioned above, the total fuel amount value corresponds to the total fuel amount that was introduced into the internal combustion engine up to the time point at which the lambda value reaches the defined lambda threshold value. Because in addition the position of the lambda probe in the exhaust gas purification device is known the fuel amount can be determined from the total fuel amount value and the position that is required to remove oxygen from a defined proportion of the exhaust gas purification device or the oxygen accumulator. This amount corresponds to the total fuel amount threshold value, which according to the above description can be used to determine the duration of the oxygen removal operation, in particular in that the oxygen removal operation is terminated as soon as the total fuel amount exceeds the total fuel amount threshold value.

According to another advantageous feature of the invention the total fuel amount threshold value $m_{Kr, grenz}$ is determined by way of the relationship $$m_{Kr,grenz} = \left(1 + \frac{(1-x)}{x} SF\right) m_{Kr},$$

wherein x is the position of the lambda probe relative to the total flow through length, $m_{Kr}$ corresponds to the total fuel amount value and SF is a safety factor. The latter can hereby be selected as desired, for example between 0 and 1.

According to another advantageous feature of the invention the safety factor is selected in dependence on an operating parameter of the exhaust gas purification device. While the safety factor can of course be set constant, it is preferably variable in dependence on the operating parameter or the state parameter. In this way the total fuel amount threshold value and correspondingly the proportion of the exhaust gas purification device or the oxygen accumulator from which oxygen is removed during the oxygen removal operation, can be adjusted to the situation at hand.

According to another advantageous feature of the invention the operating parameter includes an exhaust gas temperature and/or an exhaust gas mass flow and/or an ageing factor of the exhaust gas purification device are used. The exhaust gas temperature is for example the temperature of the exhaust gas in the exhaust gas purification device or directly upstream of the exhaust gas purification device. The exhaust gas mass flow describes the amount of exhaust gas flowing through the exhaust gas purification device per time unit. Via the ageing value the influence of ageing on the exhaust gas purification device can be taken into account. The ageing value for example results from a periodically performed diagnosis of the exhaust gas purification device. As an alternative the ageing value can also correspond to the operating time of the exhaust gas purification device since its initial use. The safety factor may only take into account one of the mentioned operating parameters. Preferably, however, multiple operating parameters are used for the safety factor, in particular all mentioned operating parameters.

According to another advantageous feature of the invention, the safety factor is selected the greater the greater the ageing factor and/or the greater the exhaust gas mass flow and/or the higher the exhaust gas temperature is. Hereby the ageing value is the greater the older the exhaust gas purification device is or the poorer the conversion efficiency of the exhaust gas purification device is. In the case of a new exhaust gas purification device or a good conversion efficiency it is sufficient to remove oxygen only from a portion of the exhaust gas purification device or the oxygen accumulator. Correspondingly the safety factor can be selected relatively small, in particular zero. On the other hand, the older the exhaust gas purification device or the poorer the conversion efficiency, the greater the safety factor preferably is. In addition the safety factor has to be selected the greater the higher the exhaust gas mass flow is, in order to reliably avoid a breakthrough of uncombusted hydrocarbons through the exhaust gas purification device. Corresponding consideration also apply to the exhaust gas temperature.

The invention also relates to a drive device, in particular for performing the method described above, wherein the drive device has an internal combustion engine and an exhaust gas purification device for exhaust gas of the internal combustion engine, wherein for removal of oxygen from the exhaust gas purification device an oxygen removal operation is provided during which the internal combustion engine is operated sub-stoichiometrically and/or additional fuel is introduced into the exhaust gas. Hereby it is provided that the drive device is configured to performed the oxygen removal operation until a lambda value detected by a lambda probe arranged in the exhaust gas purification device reaches a defined lambda threshold value.

BRIEF DESCRIPTION OF THE DRAWING

Other features and advantages of the present invention will be more readily apparent upon reading the following description of currently preferred exemplified embodiments of the invention with reference to the accompanying drawing, in which The FIGURE shows a schematic representation of an exhaust gas purification device with a lambda probe and a diagram in which the total fuel amount introduced into an internal combustion engine during a oxygen removal operation is plotted over a total flow through length of the exhaust gas purification device.

DETAILED DESCRIPTION OF PREFERRED EMBODIMENTS

Throughout all the Figures, same or corresponding elements are generally indicated by same reference numerals.

These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

The FIGURE shows a schematic representation of an exhaust gas purification device 1, which beside a here not shown internal combustion engine is a part of a drive device 2. The drive device 2 is preferably assigned to a motor vehicle and serves for providing a torque for driving the motor vehicle. During an operation of the drive device 2 fuel together with air is combusted in the internal combustion engine. The hereby generated exhaust gases are discharged via the exhaust gas purification device 1, in particular in the direction of an external environment of the drive device 2. The exhaust gas hereby flows through the exhaust gas purification device 1 in the direction of the arrow 3. The exhaust gas enters the exhaust gas purification device 1 through an exhaust gas entry point 4 and exits the exhaust gas purification device though an exhaust gas exit point 5.

In the exhaust gas purification device 1 a lambda probe 6 is arranged by means of which the residual oxygen content in the exhaust gas or the corresponding lambda value can be measured. The lambda probe 6 is arranged at a position of for example ⅔ based on the exhaust gas entry point 4 relative to a total flow through length, which is between the exhaust gas entry point 4 and the exhaust gas exit point. The exhaust gas purification device 1 has an oxygen accumulator which in the here shown exemplary embodiment extends over the total flow through length, i.e., from the exhaust gas entry point 4 to the exhaust gas exit point 5. The oxygen accumulator serves for storing oxygen contained in the exhaust gas.

When however the oxygen fill level of the exhaust gas purification device 1 becomes excessive, the conversion efficiency is adversely affected. Correspondingly an oxygen removal operation can be performed during which oxygen is removed from the exhaust gas purification device 1 or the oxygen accumulator. For this purpose the internal combustion engine is operated sub-stoichiometrically so that corresponding exhaust gas flows though the exhaust gas purification device 1.

During the oxygen removal operation, the total fuel amount introduced into the internal combustion engine is detected. In the diagram shown in the FIGURE the total fuel amount is plotted over a position x relative to the total flow through length of the exhaust gas purification device 1. The oxygen removal operation is performed at least until the lambda value detected by the lambda probe 6 arranged in the exhaust gas purification device 1 reaches a defined lambda threshold value. In the here shown exemplary embodiment this is the case at the time point at which the total fuel amount $m_{Kr,\ ges}$ corresponds to a total fuel amount value $m_{Kr}$. It is in particular provided that the total fuel amount value $m_{Kr}$ is set equal to the so far detected total fuel amount $m_{Kr,\ ges}$, when the lambda value reaches the defined lambda threshold value.

From the total fuel amount threshold value $m_{Kr}$ a total fuel amount threshold value $m_{Kr,\ grenz}$ is determined. This is accomplished for example with the relationship $$m_{Kr,grenz} = \left(1 + \frac{(1-x)}{x}SF\right)m_{Kr}$$

wherein x is the position of the lambda probe 6 relative to the total flow through length, $m_{Kr}$ is the total fuel amount threshold value and SF is a safety facto. It is provided to terminate the oxygen removal operation when the total fuel amount $m_{Kr,\,ges}$ exceeds the total fuel amount threshold value $m_{Kr,\,grenz}$.

In the here shown exemplary embodiment, a safety factor of one was selected. The safety factor can of course be set constant. Preferably, however, it is selected variable in dependence on an operating parameter. Operating parameters may include an exhaust gas temperature, an exhaust gas mass flow and/or an ageing value of the exhaust gas purification device 1. Preferably the safety factor is based on multiple, for example all, of the mentioned parameters.

With the here described approach a very efficient and targeted removal of oxygen form the exhaust gas purification device 1 is possible. In particular the removal is performed as needed wherein it can be determined whether the oxygen removal operation is sufficient up to the time point at which the lambda value reaches the defined lambda threshold value. When this is not the case a further region of the exhaust gas purification device 1 or the oxygen accumulator can be freed of oxygen.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for operating a drive device having an internal combustion engine and an exhaust gas purification device for exhaust gas of the internal combustion engine, said method comprising:
   performing an oxygen removal operation for removing oxygen from the exhaust gas purification device, said oxygen removal operation comprising at least one of operating the internal combustion engine sub-stoichiometrically and introducing additional fuel into the exhaust gas,
   performing the oxygen removal operation until a lambda value detected by a lambda probe arranged in the exhaust gas purification device reaches a defined lambda threshold value, wherein the lambda probe is arranged at a position in the exhaust gas purification device which corresponds to at least 30%, at least 40%, at least 50%, at least 60%, at least 70%, at least 80% or at least 90% of a total flow through length of the exhaust gas purification device;
   during the oxygen removal operation detecting a total fuel amount introduced into the internal combustion engine and terminating the oxygen removal operation when the total fuel amount exceeds a total fuel amount threshold value; and
   determining the total fuel amount threshold value by way of the relationship $$m_{Kr,grenz} = \left(1 + \frac{(1-x)}{x}SF\right)m_{Kr}$$

wherein x is the position of the lambda probe relative a total flow through length of the exhaust gas purification device, $m_{kr}$ is the total fuel amount value and SF is a safety factor.

2. The method of claim 1, further comprising defining the total fuel amount value as a total amount of the additional fuel introduced into the exhaust gas since a beginning of the oxygen removal operation when the lambda value detected with the lambda probe reaches the defined lambda threshold value.

3. The method of claim 2, wherein the total fuel amount threshold value is determined from the total fuel amount value and the position of the lambda probe in the exhaust gas purification device.

4. The method of claim 1, wherein the safety factor is selected in dependence on an operating parameter of the exhaust gas purification device.

5. The method of claim 4, wherein the operating parameter comprises at least one of an exhaust gas temperature, an exhaust gas mass flow and an ageing factor of the exhaust gas purification device.

6. The method of claim 5, wherein the safety factor is greater the higher the ageing value and/or the higher the exhaust gas mass flow and/or the higher the exhaust gas temperature is.

7. A drive device, comprising:
   an internal combustion engine; and
   an exhaust gas purification device for exhaust gas of the internal combustion engine, said internal combustion engine performing an oxygen removal operation during which oxygen removal operation the internal combustion engine is operated sub-stoichiometrically and/or additional fuel is introduced into the exhaust gas for removing oxygen from the exhaust gas purification device, said drive device performing the oxygen removal operation until a lambda value detected by a lambda probe arranged in the exhaust gas purification device reaches a defined lambda threshold value, said lambda probe being arranged at a position in the exhaust gas purification device which corresponds to at least 70%, at least 80% or at least 90% of a total flow through length of the exhaust gas purification device, and during the oxygen removal operation a total fuel amount is detected which is introduced into the internal combustion engine and the oxygen removal operation is terminated when the total fuel amount exceeds a total fuel amount threshold value, said total fuel amount threshold value being determined by way of the relationship $$m_{Kr,grenz} = \left(1 + \frac{(1-x)}{x}SF\right)m_{Kr}$$

wherein x is the position of the lambda probe relative a total flow through length of the exhaust gas purification device, $m_{kr}$ is the total fuel amount value and SF is a safety factor.

* * * * *